United States Patent [19]

Boyer et al.

[11] 3,957,576
[45] May 18, 1976

[54] METHOD FOR LOCALIZING FUEL CAN FAILURES IN NUCLEAR REACTORS

[75] Inventors: Pierre Boyer, Manosque; Henri Pellissier, Fontaine; Michel Wacongne, Epinay-sur-Orge, all of France

[73] Assignee: Commissariat a l'Energie Atomique, Paris, France

[22] Filed: Sept. 3, 1974

[21] Appl. No.: 502,430

Related U.S. Application Data

[63] Continuation-in-part of Ser. No. 369,231, June 12, 1973, abandoned.

[30] Foreign Application Priority Data

June 28, 1972 France .............................. 72.23402

[52] U.S. Cl............................ 176/19 LD; 176/68;
                                    220/373; 220/89 B
[51] Int. Cl.².......................................... G21C 17/00
[58] Field of Search .................. 176/19 LD, 68, 80;
                                    220/44 A, 89 B

[56] References Cited

UNITED STATES PATENTS

| | | | |
|---|---|---|---|
| 3,139,681 | 7/1964 | Goslee .............................. | 176/68 X |
| 3,157,580 | 11/1964 | Williams .............................. | 176/68 |
| 3,274,069 | 9/1966 | Alfille .............................. | 176/68 X |
| 3,663,363 | 5/1972 | Crouthamel et al............. | 176/19 LD |
| 3,846,235 | 11/1974 | Jones et al. ....................... | 176/68 X |

Primary Examiner—Samuel W. Engle
Assistant Examiner—Peter A. Nelson
Attorney, Agent, or Firm—Cameron, Kerkam, Sutton, Stowell & Stowell

[57] ABSTRACT

Tracer gases are contained in a capsule which is closed-off by a fusible seal and placed within the interior of each fuel-pin can. The capsule is formed of material having a melting point above the operating temperature of the fuel pins within a nuclear reactor. The fusible seal is formed of material having a melting point below said temperature, with the result that the tracer gases are released into the interior of each fuel pin at that temperature.

5 Claims, 2 Drawing Figures

METHOD FOR LOCALIZING FUEL CAN FAILURES IN NUCLEAR REACTORS

REFERENCE TO RELATED APPLICATION

This application is a continuation-in-part of our application Ser. No. 369,231, filed June 12, 1973, now abandoned.

BACKGROUND OF THE INVENTION

This invention relates to a method of utilization of tracer gases for localizing failures which are liable to occur in the cans of nuclear fuel pins.

The invention further relates to a novel detecting capsule which is mounted within the fuel pins and to pins fitted with capsules of this type.

It is known that any failure of a certain number of fuel cans results in the release of radioactive products into the reactor, causes considerable disturbances in the operation of the reactor and even leads to shutdown.

There is one known method of localization which consists in labelling all the fuel pins of an assembly by means of a specific tracer gas. In the event of can failure, it is only necessary to determine the composition of the released tracer in order to detect the particular fuel assembly in which the can failure has taken place. Accuracy of localization is greater as the number of available tracers is larger.

In the case of a fast reactor, this known method entails the use of mixtures of natural xenon and of xenon isotopes. If it is desired to label all the fuel assemblies in the reactor, it may be found necessary to provide a large number of tracers and consequently to employ very high isotopic enrichments, thus entailing extremely high capital costs. It is consequently an advantage in this case to employ stable tracer gases constituted by isotopic mixtures of xenon containing at least one of the following isotopes:

$$Xe^{124}, Xe^{126}, Xe^{128}, Xe^{129}.$$

and/or of krypton containing at least one of the following isotopes:

$$Kr^{78}, Kr^{80}, Kr^{82}$$

These particular isotopes permit a higher degree of selectivity since they are not found, or are found only exceptionally in the state of traces, either in the fission products or in the state of impurity.

The mixtures of isotopes of xenon and of krypton can be introduced alone but can also be introduced in a mixture, thus making it possible to increase the number of combinations which may be contemplated and to extend the range of detection potentialities.

In regard to the method of labelling of fuel pins by means of tracer gases, the solution which immediately comes to mind consists in introducing the selected gaseous compound into the interior of each fuel pin. In practice, the application of this solution proves to be both difficult and costly since it complicates the production cycle to an appreciable extent. Thus it is necessary to work in a glove box atmosphere or to have recourse to the use of plugs with tubular stems involving the successive steps of filling and then sealing.

Furthermore, such methods do not permit the possibility of checking the quantity of tracer gases introduced into each fuel pin, thereby entailing reduced sensitivity in the localization of fuel can failures. It may even happen that some fuel pins do not contain radioactive isotopes or in other words are not labelled since there is no possible means of detecting this deficiency prior to putting the pins into service.

This invention relates to a method which makes it possible to introduce the same quantity of tracer gases into each fuel pin while being simple to apply since it can be carried out in conventional workshops.

SUMMARY OF THE INVENTION

The invention is directed to a method of localization of fuel pin can failures by means of tracer gases, said method being distinguished by the fact that the tracer gases are contained in a capsule which is closed-off by a fusible seal and placed within the interior of each fuel pin can, the capsule being formed of material having a melting point above the operating temperature of the fuel pins within the reactor whilst the fusible seal is formed of material having a melting point below said temperature so that the tracer gases are released into the interior of each fuel pin at said temperature.

The non-fusible material of the capsule can be similar to that of the can, said material being formed of stainless steel, for example.

The material which constitutes the fusible seal can be a metal which is selected from: indium, tin, lead, zinc, magnesium, aluminum and their alloys.

In accordance with one advantageous embodiment of the invention, steps are taken to guard against any possible corrosion produced on the fuel can by the material constituting the fusible seal under the action of radiation. A number of alternative expedients may be adopted to this end.

By way of example, it is possible to place a porous plug of non-fusible material on the exit path of the tracer gases. Thus, after melting of the seal under the action of temperature build-up, the tracer gases can consequently pass out of the capsule through the porous plug whilst the fusible material is retained by said porous plug, thereby preventing contamination of the interior of the fuel can.

It is also possible to place a capillary tube or U-tube on the exit path of the tracer gases.

In the case of fuel pins of fast reactors, the capsule is preferably placed within the fission-gas collection chamber but it should be clearly understood that said capsule can be placed in any other suitable location of the fuel pin such as, for example, within the space formed between the fuel pellets and the plug of the fuel pin in the vicinity of the spring which holds the column of pellets in position.

Moreover, the volume of the chamber which is intended to collect the fission-product gases produced by the fuel is practically not reduced by the presence of the capsule by reason of the fact that, after melting of the seal, said gases are capable of diffusing within the internal space of the capsule.

REFERENCE TO THE DRAWINGS

Further properties and advantages of the invention will become apparent from the following description of one particular form of construction of the capsule which is given solely by way of illustration and not in any limiting sense, reference being made to the accompanying drawings, wherein.

DESCRIPTION OF THE PREFERRED EMBODIMENTS

Figure 1:
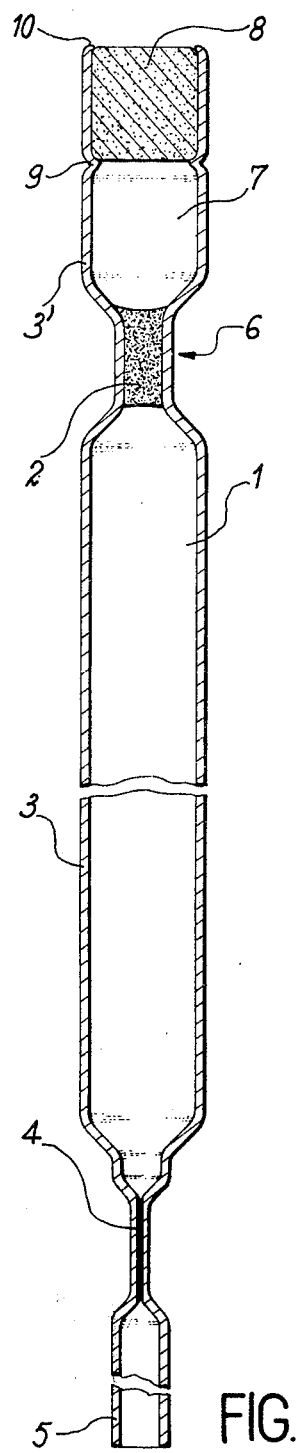
FIG. 1 is a sectional view of a capsule.

The capsule which can be seen in FIG. 1 has been obtained by drawing of a tube and comprises a chamber 1 delimited by a fusible seal 2 of tin and by the tubular wall 3 of stainless steel. The chamber 1 is closed in leak-tight manner by means of a welded joint 4 and is provided with an extension in the form of a tubular endpiece which constitutes the filler tube 5 of the capsule. The seal 2 is housed within a throat 6 which is obtained by die-stamping the wall 3. The space 7 formed by the throat and the portion 3' of the wall 3 is closed-off by a porous plug 8 of sintered stainless steel having a porosity of the order of 20 microns, for example; said plug is attached to the portion 3' by means of two crimps 9 and 10 respectively.

Figure 2:
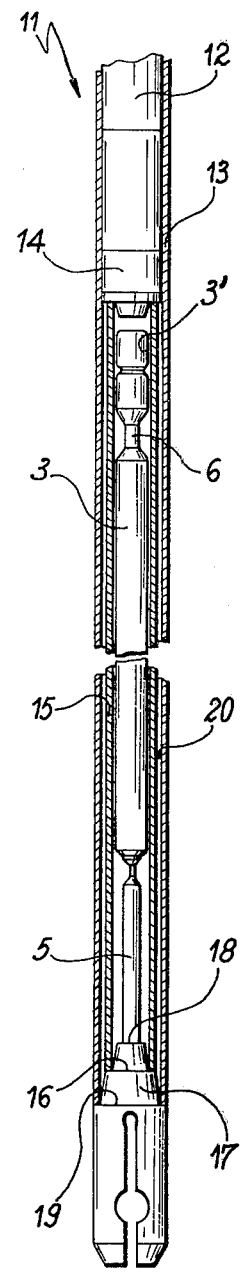
FIG. 2 is an axial sectional view of a fuel pin equipped with a capsule.

There is shown in FIG. 2 a fuel pin 11 of the type known as "Fortissimo", there being housed within said pin a capsule in which there can especially be seen the wall 3, the throat 6 and the filler tube 5. It is observed that, within the interior of the fuel pin, the first fuel pellet 12 which is surrounded by the can 13 rests on a bearing member 14 and this latter is supported by a cylindrical spacer tube 15 which is supported on a circular rim of the frusto-conical base 17. The filler tube 5 of the capsule rests on the summit 18 of the base 17 which is placed on the bottom end-fitting 19 of the fuel pin. It is pointed out that the space formed by the can 13, the bearing member 14 and the bottom end-fitting 19 of the fuel pin constitutes the fission-gas collection chamber 20 which is placed at the lower end of the fuel pin. At the time of increase to full reactor power and as soon as the temperature attains a value which is sufficient to cause melting of the seal 2, the tracer gases contained in the chamber 1 are released and pass through the porous plug 8 into the interior of the fuel pin. The molten material which could pass into the space 7 is retained by the plug 8 and therefore cannot come into contact with the fuel can.

The method according to the invention is applicable to different types of nuclear reactors, especally to sodium-cooled fast reactors having an inert gas atmosphere consisting of argon, for example, into which the tracer gas originating from a can failure is intended to escape.

If a specific tracer-gas compound is introduced into each fuel assembly, the determination of the isotopes contained in the gaseous atmosphere makes it possible to localize the fuel assembly which corresponds to the can failure.

It is also possible to reduce the number of tracer-gas compounds employed by differentiating solely the compounds introduced into fuel assemblies which are involved in one and the same irradiation campaign, that is to say fuel assemblies which have been loaded into the reactor at the same time.

In this case, pre-localization based on measurement of the ratio between the quantity of a tracer and the quantity of an isotope produced by fission, for example a measurement of the ratio:

$Xe^{134}/Xe^{129}$ or $Kr^{84}/Kr^{87}$, will serve to determine the particular group of fuel assemblies introduced at the same time within the reactor (or in other words the particular irradiation campaign) to which the fuel assembly corresponding to the can failure belongs.

Under these conditions, the number of tracers required for localizing a leak at the level of a fuel assembly is equal to the total number of assemblies divided by means of pre-localization by the number of separate groups as distinguished by age.

The capsules in accordance with the invention are so designed that they can be filled at constant pressure with a predetermined quantity of tracer gases. By way of indication, the fabrication and filling of said capsules entail the following steps:

shaping of blanks from drawn tubes;

closure of a first extremity by means of a fusible seal either by die-stamping or melting;

placing in position and crimping of the porous plug;

automatic presentation of each capsule blank over the filling circuit;

introduction of the predetermined quantity of gas into the capsule;

sealing of the filler tube by electric welding of the second extremity.

It is wholly apparent that the form of construction of a capsule as hereinabove described is given solely by way of explanatory illustration and that a large number of modifications and variations could be made by those skilled in the art without thereby departing either from the scope or the spirit of the invention.

What we claim is:

1. Structure for the localization of fuel-pin can failures by tracer gases comprising a capsule containing the tracer gases within each fuel-pin can, a fusible seal closing said capsule, said capsule being of material having a melting point above the operating temperature of the fuel-pins within the reactor, said fusible seal being of material having a melting point below said temperature whereby the tracer gases are released into the interior of each fuel-pin at said temperature.

2. Structure as described in claim 1, the material of said capsule being similar to the material of the fuel can.

3. Structure as described in claim 1, the material of said fusible seal being a metal selected from the group consisting of indium, tim, lead, zinc, magnesium, aluminum and their alloys.

4. Structure as described in claim 1, including a plug of non-fusible material at said temperature downstream of said fusible seal in the exit path of the tracer gases whereby flow of said gases is allowed while preventing the material of said fusible seal from escaping outside said capsule.

5. Structure as described in claim 1, the tracer gases being selected from the group consisting of mixtures of stable isotopes, of krypton and mixtures of stable isotopes of xenon and of krypton.

* * * * *